United States Patent
Kubota et al.

(10) Patent No.: US 11,455,209 B2
(45) Date of Patent: Sep. 27, 2022

(54) MEMORY SYSTEM

(71) Applicant: Kioxia Corporation, Tokyo (JP)

(72) Inventors: Takahiro Kubota, Kawasaki Kanagawa (JP); Daiki Watanabe, Kawasaki Kanagawa (JP); Hironori Uchikawa, Fujisawa Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/412,026

(22) Filed: Aug. 25, 2021

(65) Prior Publication Data

US 2022/0261312 A1    Aug. 18, 2022

(30) Foreign Application Priority Data

Feb. 16, 2021 (JP) ............................. JP2021-022456

(51) Int. Cl.
  *G06F 11/00* (2006.01)
  *G06F 11/10* (2006.01)
(52) U.S. Cl.
  CPC ................................. *G06F 11/1068* (2013.01)
(58) Field of Classification Search
  CPC ...................................................... G06F 11/1068
  See application file for complete search history.

(56) References Cited

U.S. PATENT DOCUMENTS

2003/0110437 A1* 6/2003 Kim .................... H03M 13/658
                                                        714/752
2006/0212781 A1   9/2006 Hewitt et al.
(Continued)

FOREIGN PATENT DOCUMENTS

JP    2012-048814    3/2012

OTHER PUBLICATIONS

M. Ramya and S. Preethi, "Detection and correction of soft errors in memory system," 2013 International Conference on Advanced Computing and Communication Systems, 2013, pp. 1-6, doi: 10.1109/ICACCS.2013.6938723. (Year: 2013).*

(Continued)

*Primary Examiner* — Daniel F. McMahon
(74) *Attorney, Agent, or Firm* — Foley & Lardner LLP (57) ABSTRACT

A memory system includes a non-volatile memory configured to store an N-dimensional error correction code and a memory controller. The memory controller is configured to calculate an $a^{th}$ soft-input value for an $a^{th}$ component code based on correction information of the $a^{th}$ component code ($1 \leq a \leq ni$) of an $i^{th}$ dimension ($1 \leq i \leq N$), $a^{th}$ reliability information, and a syndrome value of the $a^{th}$ component code, to calculate a decoded word of the $a^{th}$ component code, the $a^{th}$ correction information, and the $a^{th}$ reliability information by inputting the $a^{th}$ soft-input value and executing a decoding process of the $a^{th}$ component code, to store the $a^{th}$ correction information and $b^{th}$ correction information indicating a corrected position of a $b^{th}$ component code ($1 \leq b \leq nj$) of a $j^{th}$ dimension ($j \neq i$, $1 \leq j \leq N$) in a correction information memory, to store the $a^{th}$ reliability information in a reliability information memory, and to output an output decoded word calculated from the read information and the reliability information of each component code.

20 Claims, 6 Drawing Sheets

(56) References Cited

U.S. PATENT DOCUMENTS

| | | | |
|---|---|---|---|
| 2009/0100312 A1* | 4/2009 | Uchikawa | H03M 13/112 |
| | | | 714/752 |
| 2015/0007001 A1* | 1/2015 | Kern | H03M 13/152 |
| | | | 714/785 |
| 2016/0254827 A1* | 9/2016 | Akimoto | H03M 13/353 |
| | | | 714/774 |
| 2016/0266968 A1* | 9/2016 | Torii | G11C 11/5642 |
| 2017/0201272 A1* | 7/2017 | Kim | H03M 13/1165 |
| 2017/0317695 A1* | 11/2017 | Marchand | H03M 13/1575 |
| 2018/0260666 A1* | 9/2018 | Suzuki | H04N 1/00331 |
| 2019/0087107 A1 | 3/2019 | Watanabe | |
| 2019/0089384 A1* | 3/2019 | Kumano | H03M 13/2927 |
| 2019/0286517 A1* | 9/2019 | Watanabe | H03M 13/3707 |

OTHER PUBLICATIONS

D. Chase, "Class of algorithms for decoding block codes with channel measurement information," Information Theory, IEEE Transactions on, vol. 18, pp. 170-182, Jan. 1972.
W. Ryan and S. Lin, "Channel Codes: Classical and Modern", Cambridge University Press, pp. 94-128, Sep. 2009.

* cited by examiner

MEMORY SYSTEM

CROSS-REFERENCE TO RELATED APPLICATION(S)

This application is based upon and claims the benefit of priority from Japanese Patent Application No. 2021-022456, filed on Feb. 16, 2021, the entire contents of which are incorporated herein by reference.

FIELD

Embodiments described herein relate generally to a memory system.

BACKGROUND

In a memory system, error correction encoded data is generally stored in order to protect data to be stored. Therefore, when reading the data stored in the memory system, the system performs decoding for the error correction encoded data.

DETAILED DESCRIPTION

Embodiments provide a memory system capable of reducing the amount of memory and time required for decoding.

In general, according to at least one embodiment, a memory system includes a non-volatile memory configured to store an N-dimensional error correction code and a memory controller. The memory controller is configured to calculate an $a^{th}$ soft-input value for an $a^{th}$ component code based on correction information, reliability information, and a syndrome value of the $a^{th}$ component code ($1 \leq a \leq ni$, ni being the number of component codes of an $i^{th}$ dimension) of the $i^{th}$ dimension ($1 \leq i \leq N$), to calculate a decoded word of the $a^{th}$ component code, the $a^{th}$ correction information, and the $a^{th}$ reliability information by inputting the $a^{th}$ soft-input value and executing a decoding process of the $a^{th}$ component code, to store the $a^{th}$ correction information and $b^{th}$ correction information indicating a corrected position of a $b^{th}$ component code ($1 \leq n \leq nj$, nj being the number of component codes of an $j^{th}$ dimension, the $b^{th}$ component code being a component code associated with the $a^{th}$ correction information) of the $j^{th}$ dimension ($j \neq i$, $1 \leq j \leq N$) in a correction information memory, to store the $a^{th}$ reliability information in a reliability information memory, and to output an output decoded word calculated from the read information and the correction information and the reliability information of each component code.

Hereinafter, a memory system according to at least one embodiment will be described in detail with reference to the accompanying drawings. The present disclosure is not limited to the following embodiments.

In recent years, a memory system using a non-volatile memory such as an NAND flash memory has been used in various places by taking an advantage of a high speed thereof. However, there is a possibility that data read from the non-volatile memory contains an error caused by the lapse of time after the data is stored in the non-volatile memory, or noises generated during reading and writing. Therefore, in general, an encoding process using an error correction code is executed for the data stored in the non-volatile memory, and a decoding process using the error correction code is executed during reading, so that an error contained in the read data is removed.

Figure 1:
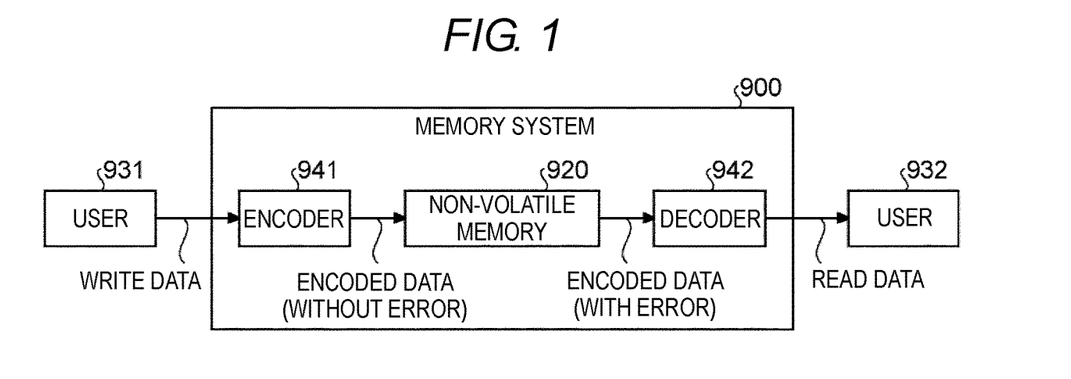
FIG. 1 is a diagram illustrating a general flow of an operation of protecting data with an error correction code.

FIG. 1 is a diagram illustrating a general flow of an operation of protecting data with an error correction code. A user in this description may be, for example, an information processing device such as a personal computer, a server device, a portable information device, or a digital still camera.

A user 931 transmits data which is a write target (hereinafter referred to as write data) to a memory system 900. The memory system 900 encodes the write data received from the user 931 using an encoder 941, and writes the thus-generated coded data (codeword) to a non-volatile memory 920. Accordingly, the coded data written in the non-volatile memory 920 does not contain an error.

The coded data stored in the non-volatile memory 920 is read in response to, for example, a read request from a user 932. Here, there is a possibility that the read coded data contains an error. Thus, by executing decoding while removing the error contained in the read coded data using a decoder 942, the original codeword is restored. After that, the original codeword or the restored write data before encoding is transmitted to the user 932. The user 932 which issued the read request may be the same user as or a different user from the user 931 which issued a write request.

Here, a case where the encoder 941 encodes the write data into a codeword composed of binary information (bits) expressed by '0' or '1' and the codeword is stored as binary information in the non-volatile memory 920 is assumed. Hereinafter, at the time of reading the data from the non-volatile memory 920, when the stored data is read as binary information indicating whether it is '0' or '1' and is input to the decoder 942, the input information is referred to as hard-input. Meanwhile, when the stored data is read as information on the probability of being '0' or the probability of being '1' and is input to the decoder 942, that probability information is referred to as soft-input.

Further, when the decoding result output by the decoder 942 is binary information as to whether the original write data is '0' or '1,' the output information is referred to as hard-output. Meanwhile, when the decoding result output by the decoder 942 contains probability information as to whether the original write data is '0' or '1,' the output information is referred to as soft-output.

A soft-input soft-output (SISO) decoder that receives a soft-input and outputs a soft-output is used as, for example, a component code decoder for a multidimensional error correction code.

Here, the multidimensional error correction code refers that at least one symbol that is the constituent unit of the error correction code is multiply protected by a plurality of smaller component codes. Further, one symbol is composed of one bit (element of a binary field), or an alphabetic element of a finite field other than the binary field. For ease of the description, an error correction code of a binary field in which one symbol is composed of one bit will be described hereinafter by way of example. There may be places in the description where the symbol and the bit are mixed, but both have the same meaning.

Figure 2:
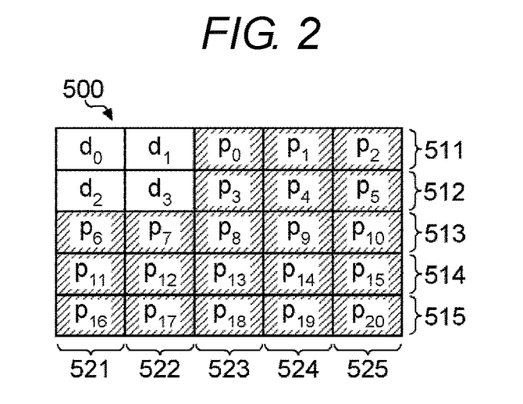
FIG. 2 is a diagram illustrating an example of a product code.

FIG. 2 illustrates a product code as an example of a multidimensional error correction code. The product code 500 illustrated in FIG. 2 has a structure in which each information symbol $d_0$ to $d_3$ which is the constituent unit is protected by hamming codes 511 to 515 and 521 to 525 which have an information length of 2 symbols and a parity length of two symbols in each of the row direction (horizontal direction in the drawing) and the column direction (vertical direction in the drawing). In such a product code 500, all of the information symbols $d_0$ to $d_3$ and parity symbols $p_0$ to $p_{20}$ are doubly protected by the hamming codes in the row direction and the hamming codes in the column direction. In the product code illustrated in FIG. 2, all of the symbols are doubly protected by component codes of the row direction (referred to as dimension 1) and the column direction (referred to as dimension 2). The multidimensional error correction code is not limited to this, and may be, for example, a generalized low density parity check (LDPC) code. In a general multidimensional error correction code including the generalized LDPC code, the multiplicity of protection may be different for each symbol and further, component codes may not be grouped into dimension 1 and dimension 2, but the present technology may also be applied to such a code configuration.

In the following, for simplicity, an example of using a two-dimensional error correction code in which each symbol is protected by two component codes which may be grouped into dimension 1 and dimension 2 will be described. Each component code of each dimension includes one or more component codes defined for each dimension. In the following, a component code corresponding to each dimension including one or more component codes may be referred to as a component code group. For example, a component code group of dimension 1 and a component code group of dimension 2 include n1 component codes and n2 component codes, respectively. An applicable error correction code is not limited to this, and may be an N-dimensional error correction code in which at least one symbol among symbols constituting the code is protected by N component code groups (N being an integer of 2 or more). When expressed by the number of component codes included in each component code group, the N-dimensional error correction code is protected by M component codes (M being a sum of ni ($1 \leq i \leq N$), N being an integer of 2 or more, and ni being the number of $i^{th}$-dimensional component codes).

Figure 3:
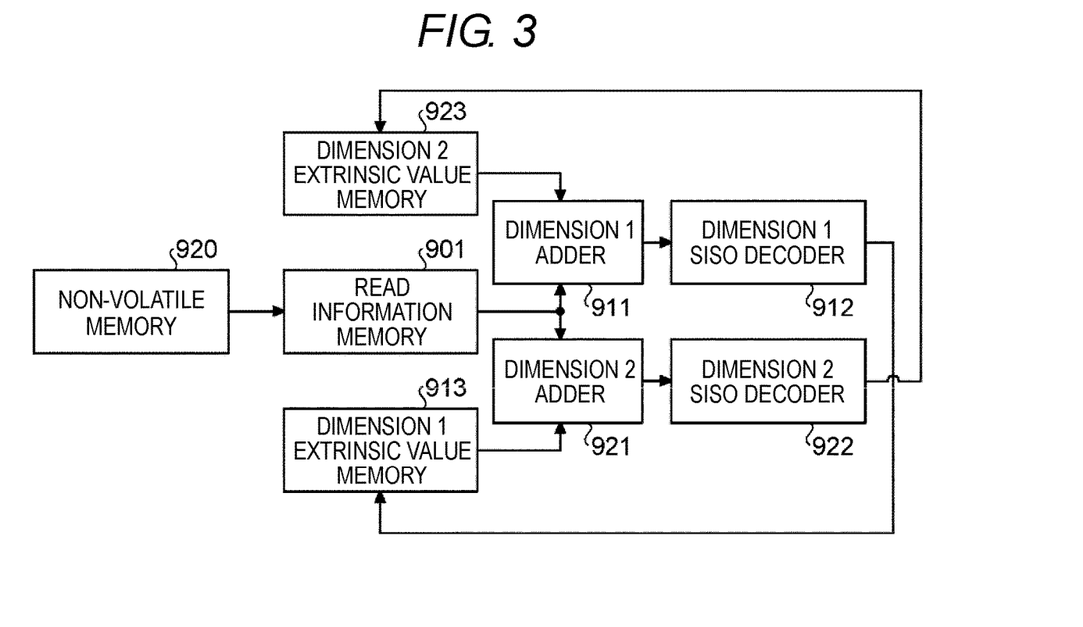
FIG. 3 is a block diagram illustrating an example of a functional block which executes turbo decoding for a two-dimensional error correction code.

Turbo decoding may be performed on such a multidimensional error correction code. FIG. 3 is a diagram illustrating an example of a functional block which executes turbo decoding for a two-dimensional error correction code. In addition, FIG. 4 is a flowchart illustrating an example of a process flow by the functional block illustrated in FIG. 3.

As illustrated in FIG. 3, the functional block which executes turbo decoding for a two-dimensional error correction code includes a read information memory 901, a dimension 1 adder 911, a dimension 1 SISO decoder 912, a dimension 1 extrinsic value memory 913, a dimension 2 adder 921, a dimension 2 SISO decoder 922, and a dimension 2 extrinsic value memory 923.

Figure 4:
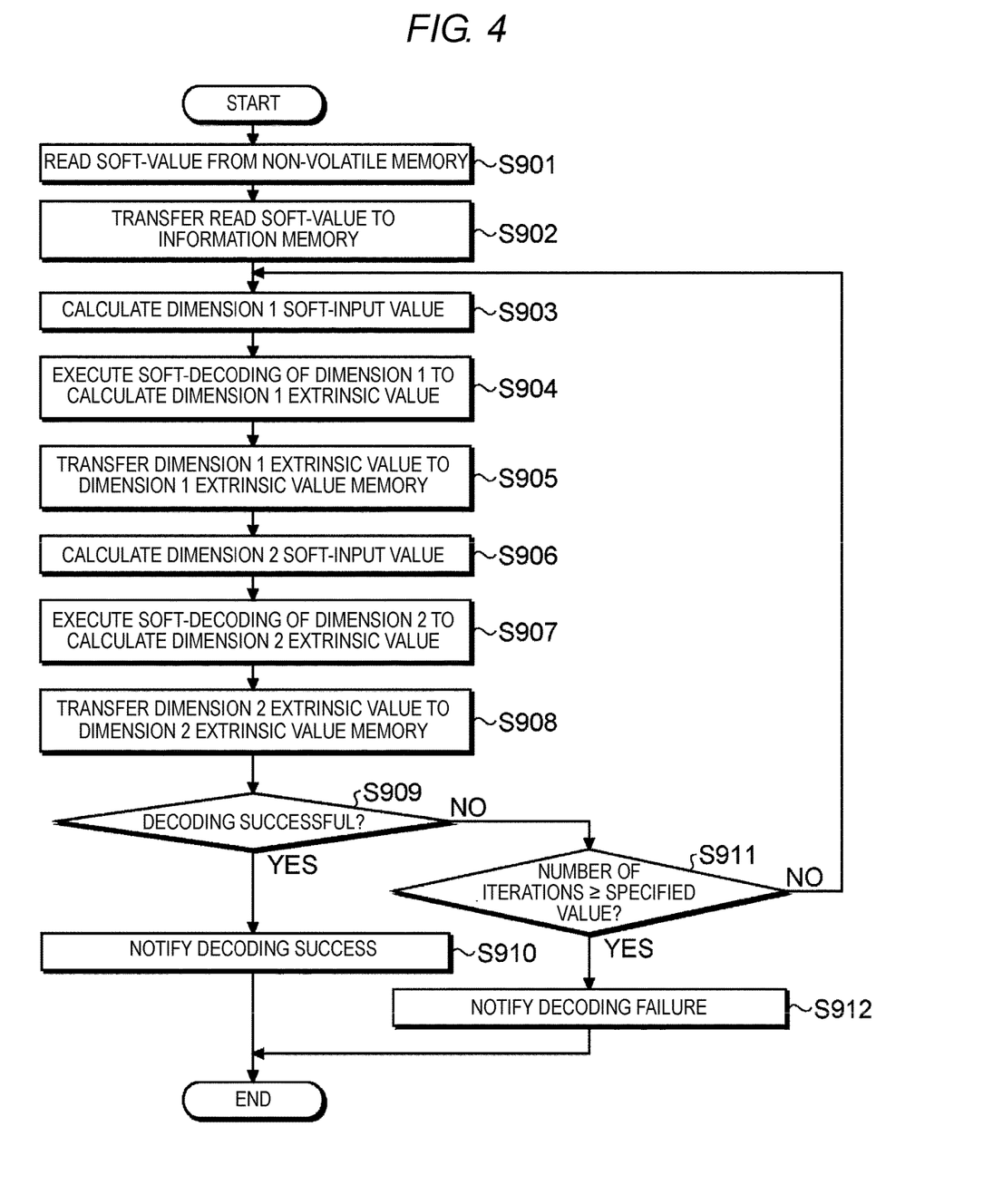
FIG. 4 is a flowchart illustrating an example of a process flow by the functional block illustrated in FIG. 3.

In a turbo decoding operation by such a functional block, as illustrated in FIG. 4, first, an error correction code from the non-volatile memory 920 is read as a soft-value (step S901). The read error correction code of the soft-value is transferred to and stored in the read information memory 901 as read information (step S902).

Next, the read information in the read information memory 901 and a dimension 2 extrinsic value in the dimension 2 extrinsic value memory 923 are added by the dimension 1 adder 911, thereby calculating a dimension 1 soft-input value (=read information+dimension 2 extrinsic value) (step S903). It is assumed that both the dimension 1 extrinsic value memory 913 and the dimension 2 extrinsic value memory 923 are reset (zero-cleared) at the start of this operation.

Subsequently, the dimension 1 soft-input value calculated by the dimension 1 adder 911 is input to the dimension 1 SISO decoder 912 for each component code. The dimension 1 SISO decoder 912 calculate a dimension 1 extrinsic value by executing soft-decoding of dimension 1 for the input dimension 1 soft-input value (step S904). The calculated dimension 1 extrinsic value is transferred to and stored in the dimension 1 extrinsic value memory 913 (step S905).

Next, the read information in the read information memory 901 and the dimension 1 extrinsic value in the dimension 1 extrinsic value memory 913 are added by the dimension 2 adder 921, thereby calculating a dimension 2 soft-input value (=read information+dimension 1 extrinsic value) (step S906).

Subsequently, the dimension 2 soft-input value calculated by the dimension 2 adder 921 is input to the dimension 2 SISO decoder 922 for each component code. The dimension 2 SISO decoder 922 calculates the dimension 2 extrinsic value by executing soft-decoding of dimension 2 for the input dimension 2 soft-input value (step S907). The calculated dimension 2 extrinsic value is transferred to and stored in the dimension 2 extrinsic value memory 923 (step S908).

Next, it is determined whether or not the decoding is successful (step S909). Successful decoding may mean, for example, the discovery of a decoded word that may be determined to be correct. If the decoding is successful (YES in step S909), a found decoded word is notified along with the success of the decoding to an external control unit (step S910), and this operation ends. Meanwhile, if the decoding is not successful (NO in step S909), it is determined whether or not the number of iterations of this operation reaches a preset specified value (step S911), and if the specified value is not reached (NO in step S911), the operation returns to step S903, so that the subsequent operation is executed. Further, if the specified value is reached (YES in step S911), a failure of the decoding is notified to the external control unit (step S912), and this operation ends. The number of iterations may be, for example, the number of times the operation from step S903 to step S908 of FIG. 4 is repeated.

For the dimension 1 SISO decoder 912 and the dimension 2 SISO decoder 922 in the configuration illustrated in FIG. 3, a Max-log-Maximum A Posteriori (MAP) decoder which adopts a decoding algorithm for calculating an extrinsic value may be used. The Max-log-MAP decoder is a decoder that calculates a posteriori probability value for each bit from a MAP decoded word and an opposite decoded word of each bit. For simplicity of the description, a quantity proportional to a posteriori probability and an approximate value thereof will also be referred below to as posteriori probability. For example, assuming that priori probabilities of all codewords are equal, the likelihood of a decoded word is a quantity proportional to a posteriori probability value of the decoded word.

Here, a MAP decoded word c* refers to a codeword $c^* = \mathrm{argmax}_c P(c|S)$ having the highest posteriori probability P calculated from a soft-input value S among all codewords $c \in C$. Further, an opposite decoded word of the $i^{th}$ bit refers to a codeword $c_{p,i} = \mathrm{argmax}_c P(c|S, c_i \neq c^*_i)$ having a high posteriori probability P calculated from the softest input value S among ones of all codewords $c \in C$ which have a value different from that of the MAP decoded word c* in the $i^{th}$ bit. Accordingly, intermediate hard-values calculated in the middle of decoding by the Max-log-MAP decoder include the MAP decoded word c* and all opposite codewords $c_{p,i}$.

Instead of a set C of all codewords, a set $C' \subset C$ of codewords having a relatively high posteriori probability may be used. In that case, an approximate MAP decoded word and an approximate opposite decoded word of the $i^{th}$ bit are required. Max-log-MAP decoding using such a codeword subset C' is inferior in correction ability to Max-log-MAP decoding using the set C of all codewords, but is reduced in the amount of calculation, and therefore, has a feature of enabling high speed decoding. For simplicity of the description, in the following, a case where an approximate MAP decoded word is used is also referred to as a MAP decoded word.

In the Max-log-MAP decoding using the codeword subset C', a logarithmic posteriori probability ratio R of the $i^{th}$ bit is calculated approximately using the following equation (1) from the posteriori probability ratio of the MAP decoded word c* and the opposite decoded word $c_{p,i}$.

$$R = (1 - 2c_i) \ln\left(\frac{P(c^*|S)}{P(c_{p,i}|S)}\right) \quad (1)$$

An extrinsic value of each dimension may be obtained by subtracting a soft-input value $S_i$ of each dimension from the logarithmic posteriori probability ratio R obtained by the equation (1). In this description, the Max-log-MAP decoding is given as an example of a decoding algorithm that calculates an extrinsic value from an intermediate hard-value calculated in the middle of decoding, but various other decoding algorithms may be used.

Since the turbo decoder using the SISO decoder as described above needs to store the extrinsic value which is probability information in the extrinsic value memory, there is a possibility that the amount of memory required for decoding increases. Further, an increase in the amount of memory required for decoding means an increase in the amount of memory accessed during a decoding process, which causes a decrease in the decoding speed and an increase in the current consumption. Therefore, it is desired to provide a memory system capable of reducing the amount of memory required for decoding.

Figure 5:
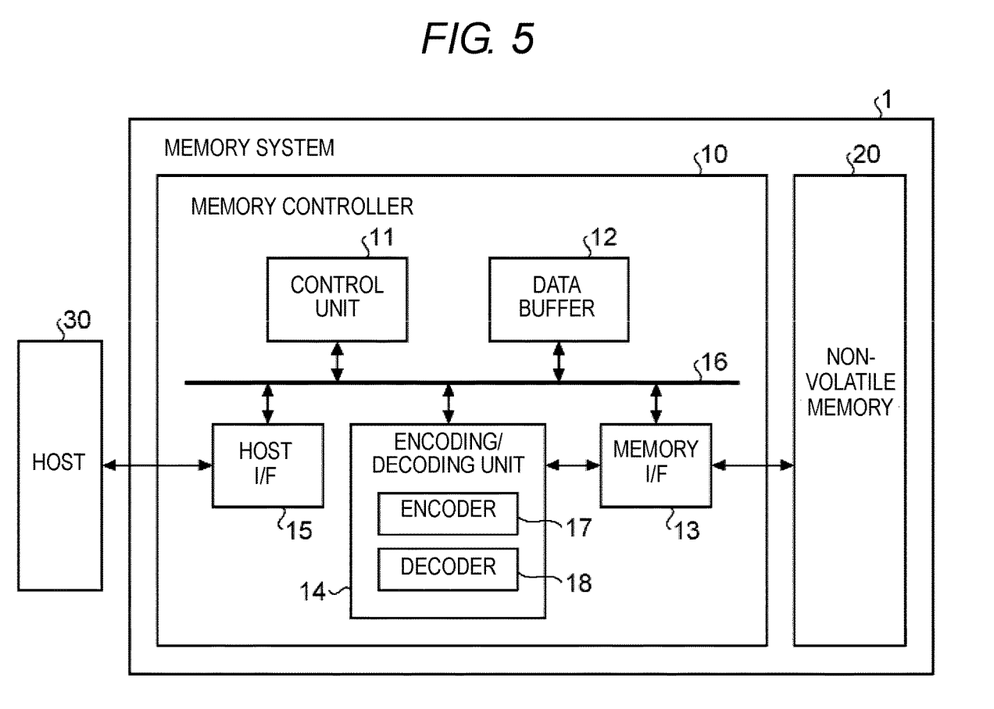
FIG. 5 is a block diagram illustrating a schematic configuration example of a memory system according to an embodiment.

FIG. 5 is a block diagram illustrating a schematic configuration example of a memory system according to an embodiment. As illustrated in FIG. 5, the memory system 1 includes a memory controller 10 and a non-volatile memory 20. The memory system 1 is connectable to a host 30, and FIG. 5 illustrates a state where the memory system 1 is connected to the host 30. The host 30 may be, for example, an electronic device such as a personal computer or a portable terminal.

The non-volatile memory 20 is a non-volatile memory that stores data in a non-volatile manner and is, for example, an NAND flash memory (hereinafter, simply referred to as an NAND memory). In the following description, a case where an NAND memory is used as the non-volatile memory 20 will be illustrated, but a storage device other than the NAND memory such as a three-dimensional structure flash memory, a resistance random access memory (ReRAM) or a ferroelectric random access memory (FeRAM) may also be used as the non-volatile memory 20. Further, the non-volatile memory 20 is not necessarily a semiconductor memory, and at least one embodiment may also be applied to various storage media other than the semiconductor memory.

The memory system 1 may be a memory card in which the memory controller 10 and the non-volatile memory 20 are configured as one package, or may be a solid state drive (SSD).

The memory controller 10 controls writing to the non-volatile memory 20 in response to a write request from the host 30. Further, the memory controller 10 controls reading from the non-volatile memory 20 in response to a read request from the host 30. The memory controller 10 includes a host interface (host I/F) 15, a memory interface (memory I/F) 13, a controller 11, an encoding/decoding unit (codec) 14, and a data buffer 12. The host I/F 15, the memory I/F 13, the controller 11, the encoding/decoding unit 14, and the data buffer 12 are connected to each other by an internal bus 16.

The host I/F 15 performs a process according to the interface standard with the host 30, and outputs a command received from the host 30 and user data which is a write target to the internal bus 16. Further, the host I/F 15 transmits user data, which is read from the non-volatile memory 20 and is restored, and a response from the controller 11 to the host 30.

The memory I/F 13 performs a write operation to the non-volatile memory 20 based on an instruction of the controller 11. Further, the memory I/F 13 performs a read operation from the non-volatile memory 20 based on an instruction of the controller 11.

The controller 11 comprehensively controls each component of the memory system 1. When receiving a command from the host 30 via the host I/F 15, the controller 11 performs a control according to the command. For example, the controller 11 instructs the memory I/F 13 to write user data and parity to the non-volatile memory 20 in response to a command from the host 30. Further, the controller 11 instructs the memory I/F 13 to read user data and parity from the non-volatile memory 20 in response to a command from the host 30.

Further, when receiving a write request of user data from the host 30, the controller 11 accumulates user data in the data buffer 12 and determines a storage area (memory area) of the user data in the non-volatile memory 20. That is, the controller 11 manages a write destination of the user data. A correspondence between a logical address of user data received from the host 30 and a physical address indicating a storage area on the non-volatile memory 20 in which that user data is stored is stored as an address conversion table.

Further, when receiving a read request from the host 30, the controller 11 converts a logical address designated by the read request into a physical address using the above-described address conversion table, and instructs the memory I/F 13 to perform reading from that physical address.

In an NAND memory, writing and reading are generally performed in the data unit called a page, and erasing is performed in the data unit called a block. In at least one embodiment, a plurality of memory cells connected to the same word line are referred to as a memory cell group. When the memory cell is a single level cell (SLC), one memory cell group corresponds to one page. When the memory cell is a multi-level cell (MLC), one memory cell group corresponds to a plurality of pages. In addition, each memory cell is connected to a word line and is also connected to a bit line. Thus, each memory cell may be identified by an address which identifies the word line and an address which identifies the bit line.

The data buffer 12 temporarily stores the user data received from the host 30 by the memory controller 10 until the user data is stored in the non-volatile memory 20. Further, the data buffer 12 temporarily stores the user data read from the non-volatile memory 20 until the user data is transmitted to the host 30. The data buffer 12 may be, for example, a general-purpose memory such as a static random access memory (SRAM) or a dynamic random access memory (DRAM).

The user data transmitted from the host 30 is transferred to the internal bus 16 and is temporarily stored in the data buffer 12. The encoding/decoding unit 14 encodes the user data to generate a codeword. Further, the encoding/decoding unit 14 decodes a received word read from the non-volatile memory 20 to restore the user data. Thus, the encoding/decoding unit 14 includes an encoder 17 and a decoder 18. Data encoded by the encoding/decoding unit 14 may include control data used inside the memory controller 10 in addition to the user data.

Next, a write operation of at least one embodiment will be described. The controller 11 instructs the encoder 17 to encode user data when writing the user data to the non-volatile memory 20. At that time, the controller 11 determines a storage location (storage address) of a codeword in the non-volatile memory 20, and instructs the determined storage location to the memory I/F 13.

The encoder 17 encodes user data on the data buffer 12 to generate a codeword based on an instruction from the controller 11. As a coding method, for example, a coding method using a bose-chandhuri-hocquenghem (BCH) code or a reed-solomon (RS) code may be adopted. The codeword generated by the encoder 17 is a multidimensional error correction code such as the product code 500 illustrated with reference to FIG. 2 in the above description. As described above, the product code 500 illustrated in FIG. 2 has a structure in which each information bit (which may be a symbol) $d_0$ to $d_3$ which is the constituent unit is protected by the component codes 511 to 515 and 521 to 525 which are hamming codes having an information length of 2 bits and a parity length of 2 bits in each of the row direction (horizontal direction in the drawing) and the column direction (vertical direction in the drawing). In such a product code 500, all of the information bits $d_0$ to $d_3$ and the parity bits $p_0$ to $p_{20}$ are doubly protected by the component codes (hamming codes) 511 to 515 in the row direction and the component codes (hamming codes) 521 and 525 in the column direction. The memory I/F 13 performs a control to store the codeword in the storage location on the non-volatile memory 20 instructed from the controller 11.

Next, a process at the time of reading from the non-volatile memory 20 of at least one embodiment will be described. At the time of reading from the non-volatile memory 20, the controller 11 designates an address on the non-volatile memory 20 and instructs the memory I/F 13 to read. Further, the controller 11 instructs the decoder 18 to start decoding. The memory I/F 13 reads a received word from the designated address of the non-volatile memory 20 in response to an instruction of the controller 11, and inputs the read received word to the decoder 18. The decoder 18 decodes the received word read from the non-volatile memory 20.

Figure 6:
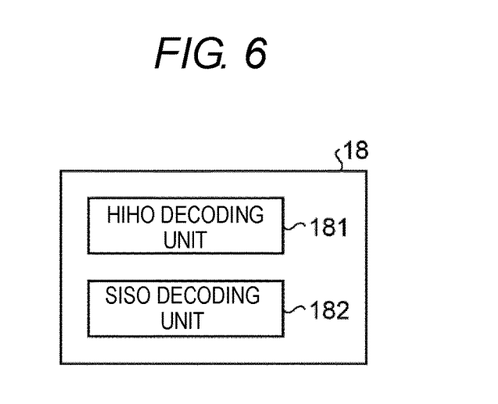
FIG. 6 is a block diagram illustrating a schematic configuration example of a decoder according to at least one embodiment.

The decoder 18 decodes the received word read from the non-volatile memory 20. FIG. 6 is a block diagram illustrating a schematic configuration example of the decoder 18. The decoder 18 includes a hard-input hard-output (HIHO) decoding unit 181 which executes decoding with a hard-value as an input and outputs a hard-value as the result and a soft-input soft-output (SISO) decoding unit 182 which executes decoding with a soft-value as an input and outputs a soft-value as the result.

In general, SISO decoding has a feature of a higher error correction capability than HIHO decoding but a longer processing time. Thus, in at least one embodiment, first, the HIHO decoding unit 181 is configured to HIHO-decode a received word read as a hard-value from the non-volatile memory 20 and to read, as a soft-value, a received word failed to be HIHO-decoded. Then, the SISO decoding unit 182 is configured to SISO-decode the received word read as the soft-value. However, the present disclosure is not limited to such a configuration, and various modifications may be made such as a configuration in which HIHO decoding is omitted and SISO decoding is executed for all received words.

Figure 7:
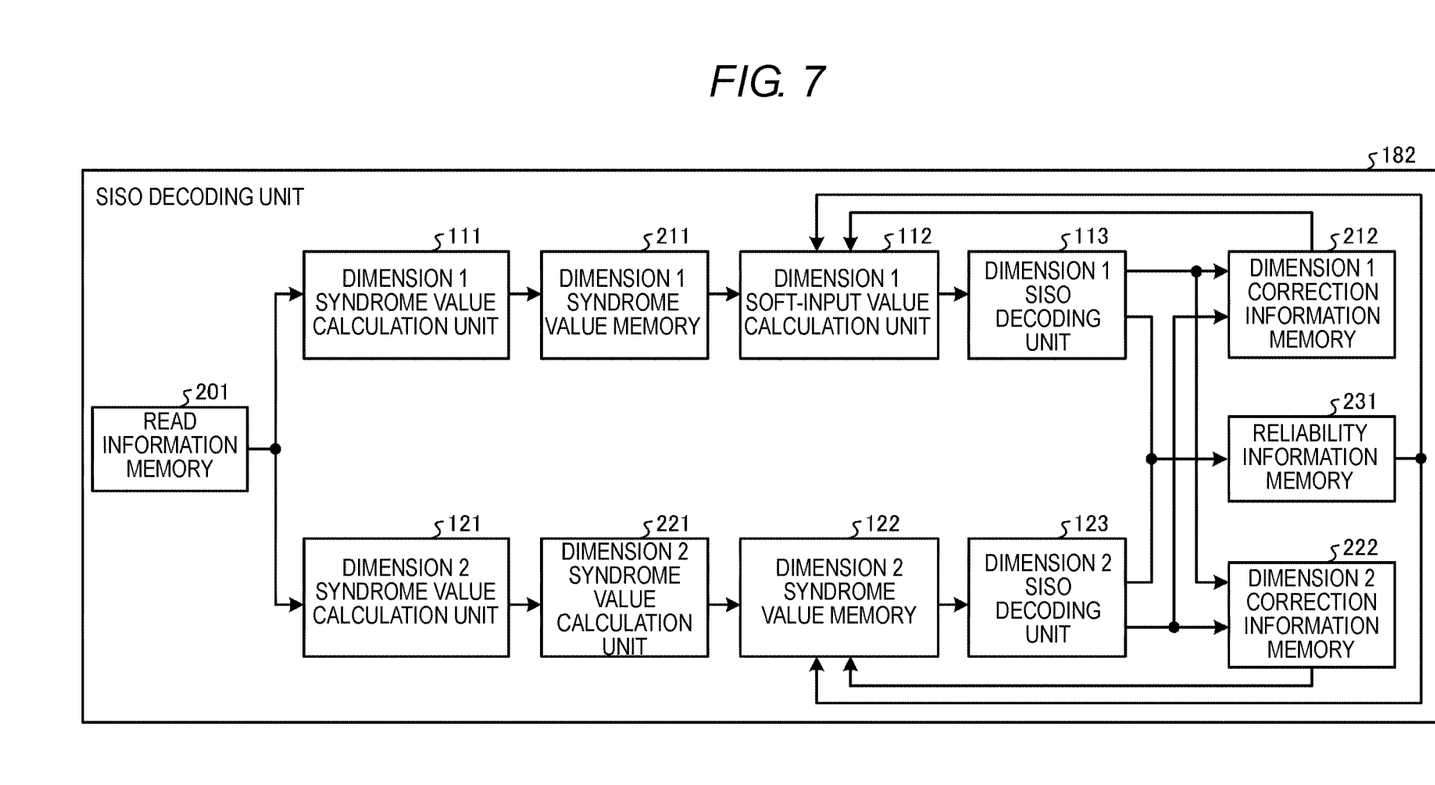
FIG. 7 is a block diagram illustrating a schematic configuration example of an SISO decoding unit.

Next, a more detailed configuration of the SISO decoding unit 182 illustrated in FIG. 6 will be described in detail with reference to the drawing. FIG. 7 is a block diagram illustrating a schematic configuration example of the SISO decoding unit 182.

As illustrated in FIG. 7, the SISO decoding unit 182 includes a read information memory 201, a dimension 1 syndrome value calculation unit 111, a dimension 1 syndrome value memory 211, a dimension 1 soft-input value calculation unit 112, a dimension 1 SISO decoding unit 113, a dimension 1 correction information memory 212, a dimension 2 syndrome value calculation unit 121, a dimension 2 syndrome value memory 221, a dimension 2 soft-input value calculation unit 122, a dimension 2 SISO decoding unit 123, a dimension 2 correction information memory 222, and a reliability information memory 231.

The read information memory 201 stores a hard-value read from the non-volatile memory 20. In at least one embodiment, the non-volatile memory 20 stores data encoded by a two-dimensional error correction code. In the hard-value stored in the read information memory 201, apart of data encoded by the two-dimensional error correction code changes to another value due to an error generated on the non-volatile memory 20. The read information memory 201 outputs the hard-value to the dimension 1 syndrome value calculation unit 111 and the dimension 2 syndrome value calculation unit 121.

The dimension 1 syndrome value calculation unit 111 calculates a syndrome value (dimension 1 syndrome value) of a component code (an example of a first component code) of a dimension 1. The syndrome value is a symbol string used by the error correction code to calculate an error position, and is obtained by, for example, multiplying a parity check matrix of the error correction code by the hard-value. The dimension 1 syndrome value calculation unit 111 may obtain the syndrome value by simpler calculation than matrix operation by using the structure of the error correction code. The dimension 1 syndrome value obtained by the dimension 1 syndrome value calculation unit 111 is output to the dimension 1 syndrome value memory 211.

The dimension 1 syndrome value memory 211 stores the dimension 1 syndrome value calculated by the dimension 1 syndrome value calculation unit 111. The dimension 1 syndrome value memory 211 outputs the dimension 1 syndrome value to the dimension 1 soft-input value calculation unit 112.

The dimension 1 soft-input value calculation unit 112 calculates a dimension 1 soft-input value (an example of a first soft-input value) using the dimension 1 syndrome value input from the dimension 1 syndrome value memory 211, correction information input from the dimension 1 correction information memory 212, and reliability information input from the reliability information memory 231. The details of a method of calculating the dimension 1 soft-input value by the dimension 1 soft-input value calculation unit 112 will be described later. The dimension 1 soft-input value calculation unit 112 outputs the dimension 1 soft-input value to the dimension 1 SISO decoding unit 113.

The dimension 1 correction information memory 212 is a memory that stores correction information (dimension 1 correction information, an example of first correction information) of a component code of dimension 1. Similarly, the dimension 2 correction information memory 222 is a memory that stores correction information (dimension 2 correction information, an example of second correction information) of a component code of dimension 2.

The correction information includes information indicating a position (corrected position) corrected by a decoding process and information indicating a value difference. The corrected position indicates, for example, a position where the value of a decoded word found by a decoding process and the value of read data (hard-value) differ from each other. When a symbol is an element of a binary field, the information indicating a value difference may be omitted. This is because, in a case of the binary field, "the values differ from each other" is limited to "bits are inverted." In a case of the binary field, the corrected position may also be interpreted as a position where bits are corrected (corrected bit position).

In the present embodiment in which the symbol is the element of the binary field, the dimension 1 correction information indicates a position where the value of a MAP decoded word found in a dimension 1 decoding process and a dimension 2 decoding process for the component code of dimension 1 is different from the hard-value stored in the read information memory 201. Similarly, the dimension 2 correction information indicates a position where the value of a MAP decoded word found in a dimension 1 decoding process and a dimension 2 decoding process for the component code of dimension 2 is different from the hard-value stored in the read information memory 201.

A method of setting an address (dimension 1 address) used when the dimension 1 correction information indicates the position and a method of setting an address (dimension 2 address) used when the dimension 2 correction information indicates the position may be different. For example, the dimension 1 address may be set so that the dimension 1 soft-input value calculation unit 112 may read the dimension 1 correction information at a higher speed. Similarly, the dimension 2 address may be set so that the dimension 2 soft-input value calculation unit 122 may read the dimension 2 correction information at a higher speed. An address in which the dimension 1 address and the dimension 2 address are shared may be used. In this case, one correction information memory in which the dimension 1 correction information memory 212 and the dimension 2 correction information memory 222 are shared may be used.

The reliability information memory 231 is a memory that stores reliability information. The reliability information is information indicating the certainty (reliability) of SISO decoding of each component code. The reliability information memory 231 stores reliability information for each component code. For example, the reliability information memory 231 stores reliability information for the component code of dimension 1 (an example of first reliability information) and reliability information for the component code of dimension 2 (an example of second reliability information).

The reliability information is, for example, a metric that is calculated from a soft-input value (=probability information) and indicates whether a probability of the codeword c being an original component codeword is high or low. For example, as reliability information for a binary code, the likelihood calculated from the soft-input value S for the codeword c may be used. The reliability information is not limited to this, and for example, may use information as follows:

(I1) the probability value of the codeword c being correct;

(I2) the value of a distance function between the codeword c and the soft-input value S; and (I3) the value obtained by applying a logarithmic relationship to the value represented in the above-described (I1) or (I2).

The dimension 1 SISO decoding unit 113 performs SISO decoding using the dimension 1 soft-input value input from the dimension 1 soft-input value calculation unit 112, and obtains correction information (corrected bit position) and reliability information on the SISO decoding. The dimension 1 SISO decoding unit 113 outputs the correction information (corrected bit position) to the dimension 1 correction information memory 212 and the dimension 2 correction information memory 222, and outputs the reliability information to the reliability information memory 231.

The dimension 1 SISO decoding unit 113 indicates the correction information (corrected bit position) to be output to the dimension 1 correction information memory 212 and the dimension 2 correction information memory 222 by an address (dimension 1 address or dimension 2 address) used in each memory, and outputs it to the corresponding memory.

As described above, a process for the component code of dimension 1 is realized using the dimension 1 syndrome value calculation unit 111, the dimension 1 syndrome value memory 211, the dimension 1 soft-input value calculation unit 112, the dimension 1 SISO decoding unit 113, the dimension 1 correction information memory 212, the reliability information memory 231, and the dimension 2 correction information memory 222.

A process for the component code of dimension 2 is equivalent to the process for the component code of dimension 1 when "dimension 1" is replaced with "dimension 2," so the detailed description thereof will be omitted. For example, each part used in the process for the component code of dimension 1 corresponds to each part used in the process for the component code of dimension 2 as follows:

the dimension 1 syndrome value calculation unit 111: the dimension 2 syndrome value calculation unit 121;

the dimension 1 syndrome value memory 211: the dimension 2 syndrome value memory 221;

the dimension 1 soft-input value calculation unit 112: the dimension 2 soft-input value calculation unit 122;

the dimension 1 SISO decoding unit 113: the dimension 2 SISO decoding unit 123; and the dimension 1 correction information memory 212: the dimension 2 correction information memory 222.

The reliability information memory 231 is commonly used in the process for the component code of dimension 1 and the process for the component code of dimension 2.

Figure 8:
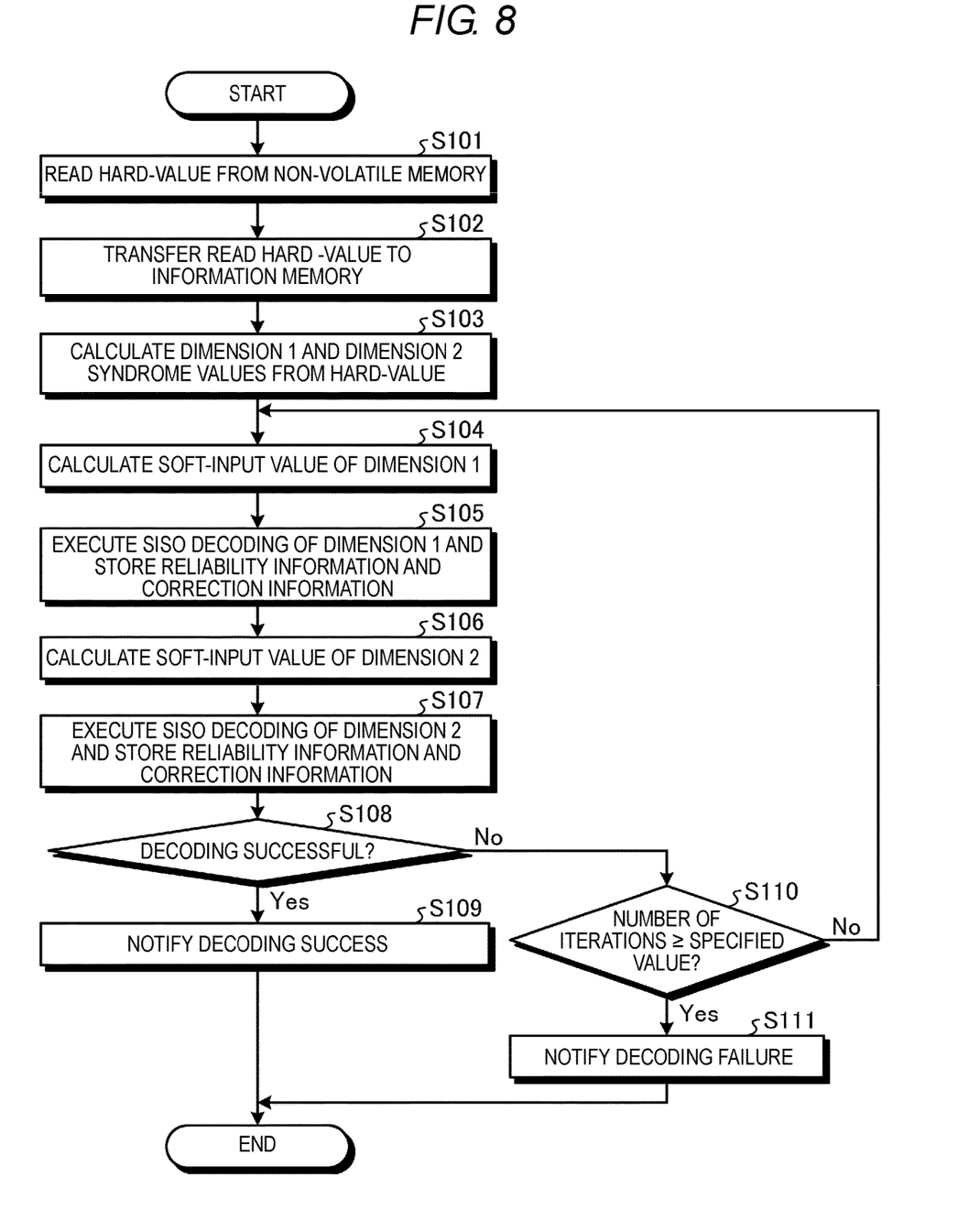
FIG. 8 is a flowchart illustrating an example of a decoding process by the memory system of at least one embodiment.

FIG. 8 is a flowchart illustrating an example of a decoding process by the memory system of at least one embodiment. FIG. 8 illustrates an example of a decoding process for a two-dimensional error correction code.

The controller 11 reads an error correction code as a hard-value from the non-volatile memory 20 (step S101). The controller 11 transfers and stores the read error correction code of the hard-value as read information to the read information memory 201 (step S102).

The dimension 1 syndrome value calculation unit 111 and the dimension 2 syndrome value calculation unit 121 calculate a dimension 1 syndrome value and a dimension 2 syndrome value from the hard-value, respectively (step S103). For example, the dimension 1 syndrome value calculation unit 111 reads the hard-value stored in the read information memory 201, calculates the dimension 1 syndrome value using the read hard-value, and stores the dimension 1 syndrome value in the dimension 1 syndrome value memory 211. The dimension 2 syndrome value calculation unit 121 reads the hard-value stored in the read information memory 201, calculates the dimension 2 syndrome value using the read hard-value, and stores the dimension 2 syndrome value in the dimension 2 syndrome value memory 221.

Next, a decoding process of the component code of dimension 1 is executed. The following steps S104 and S105 are executed for each of a plurality of component codes of dimension 1.

First, the dimension 1 soft-input value calculation unit 112 calculates a dimension 1 soft-input value using the calculated dimension 1 syndrome value, correction information input from the dimension 1 correction information memory 212, and reliability information input from the reliability information memory 231 (step S104).

Hereinafter, an example of a method of calculating the soft-input value will be described. In the following, an example of the method of calculating the soft-input value (dimension 1 soft-input value) for the component code of dimension 1 will be described, but the same procedure may also be applied to the calculation (step S106) of a soft-input value (dimension 2 soft-input value) for the component code of dimension 2.

The dimension 1 soft-input value calculation unit 112 reads a dimension 1 syndrome value s from the dimension 1 syndrome value memory 211, and substitutes the dimension 1 syndrome value s into a variable x.

The dimension 1 soft-input value calculation unit 112 reads correction information from the dimension 1 correction information memory 212. Of the read correction information, correction information found in the other dimension (dimension 2) is $a_1, a_2, \ldots, a_m$. The values of $a_1, a_2, \ldots, a_m$ indicate bit positions in the component code of dimension 1. That is, the correction information indicates that bits are inverted at each position indicated by the correction information.

The dimension 1 soft-input value calculation unit 112 reads reliability information $pr_1, pr_2, \ldots, pr_m$ corresponding to $a_1, a_2, \ldots, a_m$ from the reliability information memory 231.

The dimension 1 soft-input value calculation unit 112 performs calculation for a position $a_i$ (i=1, 2, . . . , m) as follows:

(C1) an extrinsic value $e_i$ is obtained from $pr_i$; and (C2) $\sigma_i = \lambda_i + e_i$ is obtained. If $\lambda_i \sigma_i < 0$ is satisfied, the variable x is rewritten to the value of $x + Hx_i$. $\lambda_i$ indicates a function of the read hard-value. H indicates a parity check matrix of the component code of dimension 1. $x_i$ indicates a vector in which only a component corresponding to the position $a_i$ is 1 and the other components are 0.

The dimension 1 soft-input value calculation unit 112 sets the finally obtained value of the variable x (i.e., the value obtained by rewriting in the above-described (C2) starting from the dimension 1 syndrome value s) to s'. The dimension 1 soft-input value calculation unit 112 outputs s', $\sigma_1$, $\sigma_2, \ldots, \sigma_m$ and $a_1, a_2, \ldots, a_m$ as soft-input values.

The above-described method has a procedure of obtaining s' by updating the dimension 1 syndrome value s read from the dimension 1 syndrome value memory 211 using information $a_1, a_2, \ldots, a_m$ and $pr_1, pr_2, \ldots, pr_m$ obtained when reading the dimension 1 syndrome value s. As a modification of this method, there may be a procedure of obtaining s' by updating the dimension 1 syndrome value s at the time when $a_1, a_2, \ldots, a_m$ and $pr_1, pr_2, \ldots, pr_m$ are obtained (step S105 to be described later) and storing s' in the dimension 1 syndrome value memory 211. In this case, in step S104, it is not necessary to update the value s read from the dimension 1 syndrome value memory 211.

Step S105 will be described. The dimension 1 SISO decoding unit 113 performs SISO decoding of dimension 1, and stores correction information indicating a corrected bit position in the dimension 1 correction information memory 212 and the dimension 2 correction information memory 222 and also stores reliability information obtained as the result of SISO decoding in the reliability information memory 231 (step S105).

Hereinafter, an example of SISO decoding will be described. The following example is an example of SISO decoding using the above-described example of the soft-input value. Further, although an example of SISO decoding for the component code of dimension 1 will be described below, the same procedure may also be applied to the component code of dimension 2.

The dimension 1 SISO decoding unit 113 may be configured to execute any one of SISO decoding to be described below, or may be configured to switch and execute a plurality of types of SISO decoding. For example, the dimension 1 SISO decoding unit 113 may execute SISO decoding selected from among a plurality of types of SISO decoding according to a decoding status.

Example 1 of SISO Decoding: Limit Distance Decoding

The dimension 1 SISO decoding unit 113 obtains a corrected bit position and reliability information by a procedure of decoding using s' as follows:

(E1-1) limit distance decoding is performed for the component code of dimension 1 using s' to obtain a corrected bit position e (this decoding method being called syndrome decoding);

(E1-2) reliability information pr as the result of decoding for the component code of dimension 1 is obtained from the corrected bit position e and the reliability information stored in the reliability information memory 231; and (E1-3) the corrected bit position e and the reliability information pr are output.

Example 2 of SISO Decoding: Application Method of Chase Decoding

The dimension 1 SISO decoding unit 113 obtains a corrected bit position and reliability information by a procedure of decoding using s', $\sigma_1, \sigma_2, \ldots, \sigma_m$ and $a_1, a_2, \ldots, a_m$ as follows:

(E2-1) $\sigma_1, \sigma_2, \ldots, \sigma_m$ are sorted in ascending order of the absolute value. $a_1, a_2, \ldots, a_m$ are also rearranged so that subscripts thereof correspond to $\sigma_1, \sigma_2, \ldots, \sigma_m$. This sorting may be performed approximately. Hereinafter, $\sigma_1, \sigma_2, \ldots, \sigma_m$ and $a_1, a_2, \ldots, a_m$ are ones after the sorting process;

(E2-2) With t and f (t≤m and f≤t) as arbitrary constants, f pieces of $a_1, a_2, \ldots, a_t$ are selected. The following process (E2-2-1) is performed for each of combinations of $_tC_f$ selections;

(E2-2-1) A syndrome value s" in which the bit at a selected position is f is calculated from s' (the same calculation as in (C2) of step S104). Then, syndrome decoding is performed using s" to obtain the corrected bit position e. Further, the reliability information pr of the component code of dimension 1 is obtained from the corrected bit position e, f inverted positions, and the reliability information stored in the reliability information memory 231;

(E2-3) Among sets of the corrected bit position and the reliability information obtained for each of the combinations of $_tC_f$ selections, a set having the maximum reliability information is set to (ê, prˆ); and (E2-4) the corrected bit position ê and the reliability information prˆ are output.

Returning to the description of the flowchart of FIG. 8, next, a decoding process for the component code of dimension 2 is executed. The following steps S106 and S107 are executed for each of a plurality of component codes of dimension 2.

First, the dimension 2 soft-input value calculation unit 122 calculates a dimension 2 soft-input value (an example of second soft-input value) using the calculated dimension 2 syndrome value, correction information input from the dimension 2 correction information memory 222, and reliability information input from the reliability information memory 231 (step S106). Step S106 may be executed by the same procedure as in step S104.

The dimension 2 SISO decoding unit 123 performs SISO decoding of dimension 2, stores correction information indicating a correction bit position in the dimension 1 correction information memory 212 and the dimension 2 correction information memory 222, and stores reliability information obtained as the result of SISO decoding in the reliability information memory 231 (step S107). Step S107 may be executed by the same procedure as in step S105.

Subsequently, the decoder 18 determines whether or not the decoding is successful (step S108). Successful decoding may mean, for example, the discovery of a decoded word that may be determined to be correct.

Meanwhile, if the decoding is not successful (NO in step S108), the decoder 18 determines whether or not the number of iterations of this operation reaches a preset specified value (step S110). If the specified value is not reached (NO in step S110), the decoder 18 increments the number of iterations by 1, and the operation is returned to step S104, so that the subsequent operation is executed. Further, if the specified value is reached (YES in step S110), the decoder 18 notifies the external control unit of a decoding failure (step S111), and ends the decoding process. The number of iterations may be, for example, the number of times the operation of steps S104 to S107 is repeated.

In addition, if the decoding is successful (YES in step S108), the decoder 18 notifies the external control unit of a decoded word along with the success of decoding (step S109), and ends the decoding process. The decoder 18 corrects the hard-value written in the read information memory 201 using, for example, the information which is obtained by the decoding process and is stored in the reliability information memory 231, the dimension 1 correction information memory 212, and the dimension 2 correction information memory 222. The decoder 18 uses the corrected hard-value as a final output (output decoded word).

For example, the decoder 18 calculates a logarithmic posteriori probability ratio for each bit of the hard-value in the read information memory 201 using the above-described equation (1). The decoder 18 determines whether or not to correct the hard-value corresponding to each bit stored in the read information memory 201 based on the positive or negative value of the calculated logarithmic posteriori probability ratio. The decoder 18 corrects the hard-value as determined and uses it as an output decoded word.

In the example of FIG. 8, the hard-values stored in the read information memory 201 are collectively corrected in step S109. A method of correcting the hard-value is not limited to this disclosure, and for example, a method of correcting the hard-value each time immediately after each repeated SISO decoding may be used. In this case, the correction process in step S109 is unnecessary, and the hard-value stored in the read information memory 201 at the time of reaching the step S109 may be used as a final output (output decoded word) as it is.

Although the example of the decoding process for the two-dimensional error correction code has been described heretofore, as described above, the same procedure may also be applied to a multidimensional (N-dimensional) error correction code. For example, when the $a^{th}$ (1≤a≤ni, ni being the number of component codes of the $i^{th}$ dimension) component code of the $i^{th}$(1≤i≤N) dimension among N dimensions is defined, correction information, reliability information, and a soft-input value for the $a^{th}$ component code are defined as the $a^{th}$ correction information, the $a^{th}$ reliability information, and the $a^{th}$ soft-input value, respectively.

In this case, the decoder 18 calculates the $a^{th}$ soft-input value for the $a^{th}$ component code based on the $a^{th}$ correction information, the $a^{th}$ reliability information, and a syndrome value of the $a^{th}$ component code. The decoder 18 inputs the $a^{th}$ soft-input value to execute a decoding process for the $a^{th}$ component code, thereby calculating a decoded word of the $a^{th}$ component code, the $a^{th}$ correction information, and the $a^{th}$ reliability information. The decoder 18 stores the calculated $a^{th}$ correction information and the $b^{th}$ correction information which indicates a corrected position of the $b^{th}$ component code (j≠i, 1≤j≤N, b being the index of a component code of the $j^{th}$ dimension) corrected by the decoding process of the $a^{th}$ component code in the correction information memory, and stores the $a^{th}$ reliability information in the reliability information memory.

(Modification 1)

The memory controller 10 may determine whether or not to execute the calculation of the correction information and the calculation of the reliability information according to state information indicating the state of a decoding process.

For example, the decoder 18 stores, after the SISO decoding, state information indicating the decoded state of the component code in a memory or a register (hereinafter, a state information memory) in the decoder 18. The state information may be used for various purposes as follows.

(Category 1) Use for Purpose of Shortening Decoding Process Time

As described above, the values calculated by SISO decoding are correction information (corrected bit position) and reliability information. However, if there is not sufficient change in the input of the repeatedly executed SISO decoding as in at least one embodiment, the calculated corrected bit position and reliability information also have no change. Thus, the state information is used to determine "Can new information be obtained by performing SISO decoding from now on?"

Figure 9:
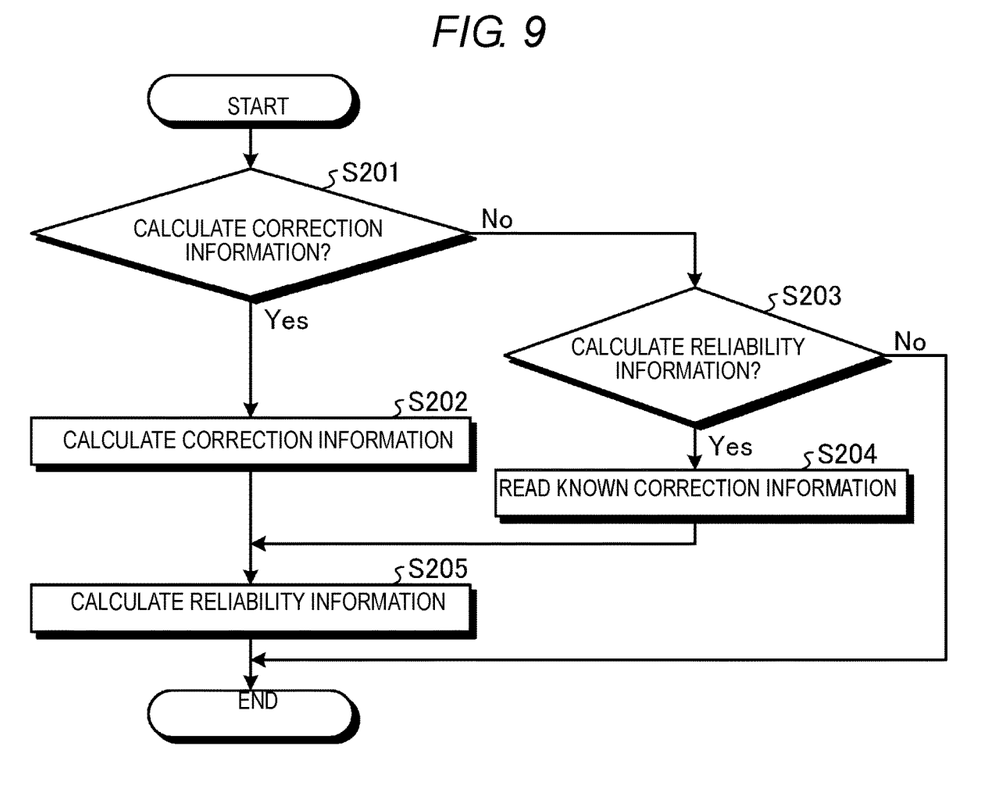
FIG. 9 is a flowchart illustrating an example of a determination process according to state information.

For example, by a determination process illustrated in FIG. 9, a process to be executed next is determined according to the state information. The process of FIG. 9 may be executed as, for example, a process for determining whether or not to execute the SISO decoding of steps S105 and S107 of FIG. 8. In the following, a process for the component code of dimension 1 (step S105) will be described as an example. A process for the component code of dimension 2 may be realized by the same procedure.

The decoder 18 determines whether or not to calculate correction information using the state information (step S201). The details of this determination will be described later. If it is determined to calculate the correction information (YES in step S201), the dimension 1 SISO decoding unit 113 performs SISO decoding of dimension 1. That is, the dimension 1 SISO decoding unit 113 calculates and stores the correction information in the dimension 1 correction information memory 212 and the dimension 2 correction information memory 222 (step S202), and also calculates and stores reliability information in the reliability information memory 231 (step S205).

If it is determined not to calculate the correction information (NO in step S201), the decoder 18 determines whether or not to calculate the reliability information using the state information (step S203). The details of this determination will be described later. If it is determined to calculate the reliability information (YES in step S203), the dimension 1 SISO decoding unit 113 reads known correction information (step S204), and calculates reliability information of the component code of dimension 1 using the read correction information and the reliability information stored in the reliability information memory 231 (step S205).

If it is determined not to calculate the reliability information (NO in step S203), the decoder 18 ends the operation without executing SISO decoding.

Hereinafter, an example of the determination in step S201 of FIG. 9 and an example of the determination in step S203 will be described. In addition, each of usage examples described below may be used alone, or may be used in combination with other usage examples.

(Usage Example 1) Change in Syndrome

A usage example 1 is an example of determining, according to the decoding result of any dimension, whether or not a syndrome value of another dimension changes, and determining whether or not to skip syndrome decoding of the other dimension. For each component code, state information indicating "whether or not a syndrome value changes from the value at the time of a previous decoding process" is used.

For example, the dimension 1 SISO decoding unit 113 stores state information indicating that "the syndrome value is changed" for a component code in which "a soft-input value is changed and the syndrome value is changed accordingly" among the component code of dimension 2 (which is the opposite dimension) by the result of SISO decoding in step S105.

Specifically, a change in the syndrome value (of the opposite dimension) is determined as follows. First, the dimension 1 SISO decoding unit 113 obtains the correction information a and the reliability information pr as the result of SISO decoding in step S105. The dimension 1 SISO decoding unit 113 may use the correction information a and the reliability information pr to determine "whether or not the syndrome value is changed" at the time of step S105 when the SISO decoding of dimension 2 is executed in step S107. For example, the dimension 1 SISO decoding unit 113 determines whether or not the condition of $\lambda_i \sigma_i < 0_i$ is satisfied in the same manner as in the above-described (C2), and determines that the syndrome value is changed if the condition is satisfied.

When executing the SISO decoding of dimension 2 in step S107, the decoder 18 may determine whether or not to skip the SISO decoding for each component code using the stored state information. For example, in step S201 of FIG. 9, the decoder 18 determines whether or not the state information indicates "the syndrome value is changed." When the state information indicates "the syndrome value is changed," the decoder 18 determines to calculate the correction information (YES in step S201).

(Usage Example 2) Addition of Bit Flip Candidate

A usage example 2 is an example of determining whether or not to skip the syndrome decoding of the other dimension as in the usage example 1. As described above, a change in the syndrome value in (C2) occurs at the time of $\lambda_i \sigma_i < 0$.

Meanwhile, for example, when "Example 2 of SISO decoding: Application Method of Chase Decoding" is applied as SISO decoding, there is a possibility that a bit flip candidate is added as $\sigma_i$ having a small absolute value is obtained even if the syndrome value is not changed. Thus, in the usage example 2, state information indicating "whether or not $\sigma_i$ having a small absolute value is obtained" is used. This state information may be rephrased as state information indicating "whether or not a candidate for a position to be corrected is newly added" or "whether or not a bit position having a high probability of being incorrect is added."

For example, in step S201 of FIG. 9, the decoder 18 determines whether or not the state information indicates "a bit position with a high probability of being incorrect is added." The decoder 18 determines to calculate the correction information (YES in step S201) when the state information indicates "a bit position having a high probability of being incorrect is added."

(Usage Example 3) Change in Reliability Information

A usage example 3 is an example of determining, according to the decoding result of any dimension, whether or not to skip calculation of reliability information of another dimension. The reliability information to be calculated is a function of $\sigma_i$ which is a soft-input value. Accordingly, if it is known that the soft-input value is not changed, the calculation of the reliability information may be skipped.

Thus, for example, when the correction information and the reliability information of dimension 1 are obtained in step S105, the decoder 18 calculates a soft-input value of dimension 2 ($\sigma_i=\lambda_t+e_i$) at that time. The decoder 18 compares the calculated soft-input value with a soft-input value at the time of a previous decoding process (which is, for example, obtained via approximate calculation from the past correction information and reliability information stored in the memory, or the soft-input value itself at the time of the previous decoding process being stored in the state information memory) to determine "whether or not the soft-input value is changed from the value at the time of the previous decoding process," and stores state information indicating the result.

When executing the SISO decoding of dimension 2 in step S107, the decoder 18 may determine whether or not to skip calculation of reliability information for each component code using the stored state information. For example, in step S203 of FIG. 9, the decoder 18 determines whether or not the state information indicates "the soft-input value is changed from the value at the time of the previous decoding process." The decoder 18 determines to calculate the reliability information (YES in step S203) when the state information indicates "the soft-input value is changed from the value at the time of the previous decoding process."

(Usage Example 4) Decoding Process Executed Immediately Before

A usage example 4 is an example in which a function of switching and executing a plurality of types of SISO decoding is provided. In the usage example 4, state information indicating "the type of a previous decoding process" is used. For example, the state information indicates the type of the kth (k being an integer of 1 or more) decoding process. The decoder 18 determines to calculate the correction information (YES in step S201 in FIG. 9) when the type of a decoding process selected at the current time, i.e., the type of the $(k+1)^{th}$ decoding process is different from the type of the kth decoding process indicated by the state information.

(Category 2) Use for Purpose of Improving Accuracy of Error Correction

In Category 1, state information is used for the purpose of shortening the decoding process time. Category 2 describes an example in which state information is used for the purpose of improving the accuracy of error correction.

(Usage Example 5) Excessive Capacity of Correction Information Memory

One of the purposes of at least one embodiment is to reduce the amount of memory required for decoding. Therefore, it is desirable that the dimension 1 correction information memory 212 and the dimension 2 correction information memory 222 (hereinafter referred to as correction information memory) are configured to have a required minimum storage capacity. In this case, as the number of pieces of correction information increases, a situation may occur in which all of the correction information may not be stored in the correction information memory.

In the usage example 5, state information indicating "whether or not the amount of data of correction information exceeds the amount of data that may be stored in the correction information memory" is used. This state information may also be interpreted as indicating whether or not the remaining storage capacity of the correction information memory is equal to or less than the threshold value (first threshold value).

For example, the decoder 18 determines to calculate the correction information (YES in step S201 of FIG. 9) when the state information indicates "the amount of data of the correction information exceeds the amount of data that may be stored in the correction information memory" at the time of syndrome decoding. Thus, the correction information that could not be stored in the correction information memory may be found again, and the accuracy of error correction may be improved.

State information indicating "whether or not no correction information is stored in the correction information memory," in other words, "whether or not the correction information memory is empty" may be used. For example, when the state information indicates "no correction information is stored in the correction information memory," the decoder 18 determines to calculate the correction information (YES in step S201 of FIG. 9).

(Modification 2)

In Modification 1, it is determined whether or not to skip the process using the state information. The information used to determine whether or not to skip the process is not limited to the state information. In Modification 2, the skip of a current decoding process is determined using reliability information calculated in a previous decoding process.

For example, a configuration in which the reliability information indicates "an estimated value of a probability that the decoding result of the component code is correct" is assumed. In such a configuration, if the value of the reliability information exceeds ½, it is considered that "another decoding result with a higher probability of being correct" is not obtained even if it is again tried to find a corrected position. Thus, the decoder 18 determines whether or not to execute the SISO decoding of step S105 and step S107 of FIG. 8 corresponding to the $(k+1)^{th}$ decoding process based on whether or not the reliability information calculated in the kth (k being an integer of 1 or more) decoding process exceeds ½. For example, the decoder 18 determines to skip the SISO decoding when the reliability information calculated in the previous (kth) decoding process exceeds ½. After that, as in steps S203 to S205 of FIG. 9, it may be determined whether or not to calculate the reliability information.

(Modification 3)

In Modification 3, a function of reducing the amount of information stored in the correction information memory is provided in order to avoid the occurrence of a situation in which "the amount of data of correction information exceeds the amount of data that may be stored in the correction information memory." For example, when the reliability information is sufficiently high, the decoder 18 corrects the hard-value stored in the read information memory 201 according to the correction information, instead of storing the correction information in the correction information memory. In addition, the sufficiently high reliability information is, for example, a case where the reliability information is larger than the threshold value (second threshold value). Further, the decoder 18 also corrects each syndrome value stored in the syndrome value memory (the dimension 1 syndrome value memory 211 and the dimension 2 syndrome value memory 221) so as to match with the corrected hard-value. In this way, detected error information may be reflected in the hard-value without storing the correction information in the correction information memory.

As a method of reducing the amount of memory required for decoding, instead of storing an extrinsic value itself in the extrinsic value memory, it is conceivable to store intermediate information required for calculating an extrinsic value (for example, a MAP decoded word and reliability information indicating the correctness of that decoded word) and generate the extrinsic value using the intermediate information at the time when the extrinsic value is required. However, in such a method, since the amount of data of the MAP decoded word depends on the code length, the effect of reducing the amount of memory is reduced when the code length is long.

In at least one embodiment, the decoding process including the calculation of the extrinsic value is executed using the syndrome value and the correction information which do not depend on the code length. This makes it possible to reduce the amount of memory required for decoding. Further, since the read/write time of the information used for the decoding process is shortened, the process time of the decoding process may be shortened.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a non-volatile memory configured to store an N-dimensional error correction code, wherein in the N-dimensional error correction code at least one symbol among symbols constituting the code is protected by N component code groups (N being an integer of 2 or more);
a read information memory configured to store read information read from the non-volatile memory;
a syndrome value memory configured to store a syndrome value of each of M component codes ($1 \leq i \leq N$, ni being a number of component codes included in the component code group of an $i^{th}$ dimension, and M being a sum of ni) calculated from the read information;
a correction information memory configured to store $a^{th}$ correction information indicating at least a position corrected by each decoding process of an $a^{th}$ component code for each $a^{th}$ component code of the $i^{th}$ dimension ($1 \leq a \leq ni$);
a reliability information memory configured to store $a^{th}$ reliability information indicating reliability of a decoded word obtained in the decoding process of the $a^{th}$ component code; and
a memory controller configured to:
calculate an $a^{th}$ soft-input value for the $a^{th}$ component code based on the $a^{th}$ correction information, the $a^{th}$ reliability information, and the syndrome value of the $a^{th}$ component code;
calculate a decoded word of the $a^{th}$ component code, the $a^{th}$ correction information, and the $a^{th}$ reliability information by inputting the $a^{th}$ soft-input value and executing the decoding process of the $a^{th}$ component code;
store the calculated $a^{th}$ correction information and $b^{th}$ correction information indicating a corrected position of a $b^{th}$ component code (($1 \leq b \leq nj$) of a $j^{th}$ dimension ($j \neq i$, $1 \leq j \leq N$) corrected by the decoding process of the $a^{th}$ component code in the correction information memory;
store the calculated $a^{th}$ reliability information in the reliability information memory; and output an output decoded word calculated from the read information, the correction information, and M pieces of the $a^{th}$ reliability information.

2. The memory system according to claim 1, wherein the memory controller is configured to execute a decoding process selected from among a plurality of types of decoding processes for the component code of the $i^{th}$ dimension.

3. The memory system according to claim 1, wherein the memory controller is configured to determine whether or not to execute calculation of the $a^{th}$ correction information and calculation of the $a^{th}$ reliability information according to state information indicating a state of the decoding process.

4. The memory system according to claim 3, wherein the state information indicates whether or not the syndrome value of the $a^{th}$ component code is changed, and
the memory controller is configured to determine to execute the calculation of the $a^{th}$ correction information and the calculation of the $a^{th}$ reliability information when the state information indicates that the syndrome value is changed.

5. The memory system according to claim 3, wherein the state information indicates whether or not a new candidate of a position to be corrected by the decoding process is added, and
the memory controller is configured to determine to execute the calculation of the $a^{th}$ correction information and the calculation of the $a^{th}$ reliability information when the state information indicates that the new candidate of the position to be corrected by the decoding process is added.

6. The memory system according to claim 3, wherein the state information indicates whether or not the $a^{th}$ soft-input value is changed, and
the memory controller is configured to determine to execute the calculation of the $a^{th}$ reliability information when the state information indicates that the $a^{th}$ soft-input value is changed.

7. The memory system according to claim 3, wherein the memory controller is configured to repeatedly execute the decoding process of the $a^{th}$ component code until an end condition is satisfied, and to execute a decoding process selected from among a plurality of types of decoding process for the $a^{th}$ component code,
the state information indicates a type of the selected decoding process, and
the memory controller is configured to determine to execute the calculation of the $a^{th}$ correction information when a type of a $k^{th}$ (k being an integer of 1 or more) decoding process indicated by the state information is different from a type of a (k+1)th decoding process.

8. The memory system according to claim 3, wherein the state information indicates whether or not a remaining storage capacity of the correction information memory is equal to or less than a first threshold value, and
the memory controller is configured to determine to execute the calculation of the $a^{th}$ reliability information when the remaining storage capacity of the correction information memory is equal to or less than the first threshold value.

9. The memory system according to claim 3, wherein the state information indicates whether or not the correction information is stored in the correction information memory, and
the memory controller is configured to determine to execute the calculation of the $a^{th}$ correction information and the calculation of the $a^{th}$ reliability information when the state information indicates that the correction information is not stored in the correction information memory.

10. The memory system according to claim 1, wherein the memory controller is configured to repeatedly execute the decoding process of the $a^{th}$ component code until an end condition is satisfied, and to determine whether or not to execute calculation of the $a^{th}$ correction information and calculation of the $a^{th}$ reliability information in a (k+1)th decoding process according to the $a^{th}$ reliability information calculated in a $k^{th}$ (k being an integer of 1 or more) decoding process.

11. The memory system according to claim 1, wherein the memory controller is configured to correct the read information stored in the read information memory based on the $a^{th}$ correction information and to correct the syndrome value stored in the syndrome value memory according to the correction of the read information when the $a^{th}$ reliability information is larger than a second threshold value.

12. A method of operating a memory system, the memory system having: a non-volatile memory configured to store an N-dimensional error correction code, wherein in the N-dimensional error correction code at least one symbol among symbols constituting the code is protected by N component code groups (N being an integer of 2 or more); a read information memory configured to store read information read from the non-volatile memory; a syndrome value memory configured to store a syndrome value of each of M component codes (1≤i≤N, ni being a number of component codes included in the component code group of an $i^{th}$ dimension, and M being a sum of ni) calculated from the read information; a correction information memory configured to store $a^{th}$ correction information indicating at least a position corrected by each decoding process of an $a^{th}$ component code for each $a^{th}$ component code of the $i^{th}$ dimension (1≤a≤ni); and a reliability information memory configured to store $a^{th}$ reliability information indicating reliability of a decoded word obtained in the decoding process of the $a^{th}$ component code, the method comprising:
calculating an $a^{th}$ soft-input value for the $a^{th}$ component code based on the $a^{th}$ correction information, the $a^{th}$ reliability information, and the syndrome value of the $a^{th}$ component code;
calculating a decoded word of the $a^{th}$ component code, the $a^{th}$ correction information, and the $a^{th}$ reliability information by inputting the $a^{th}$ soft-input value and executing the decoding process of the $a^{th}$ component code;
storing the calculated $a^{th}$ correction information and $b^{th}$ correction information indicating a corrected position of a $b^{th}$ component code ((1≤b≤nj) of a $j^{th}$ dimension (j≠i, 1≤j≤N) corrected by the decoding process of the $a^{th}$ component code in the correction information memory;
storing the calculated $a^{th}$ reliability information in the reliability information memory; and
outputting an output decoded word calculated from the read information, the correction information, and M pieces of the $a^{th}$ reliability information.

13. The method according to claim 12, further comprising executing a decoding process selected from among a plurality of types of decoding processes for the component code of the $i^{th}$ dimension.

14. The method according to claim 12, further comprising determining whether or not to execute calculation of the $a^{th}$ correction information and calculation of the $a^{th}$ reliability information according to state information indicating a state of the decoding process.

15. The method according to claim 14, wherein the state information indicates whether or not the syndrome value of the $a^{th}$ component code is changed, and the method further comprising determining to execute the calculation of the $a^{th}$ correction information and the calculation of the $a^{th}$ reliability information when the state information indicates that the syndrome value is changed.

16. The method according to claim 14, wherein the state information indicates whether or not a new candidate of a position to be corrected by the decoding process is added, and the method further comprising executing the calculation of the $a^{th}$ correction information and the calculation of the $a^{th}$ reliability information when the state information indicates that the new candidate of the position to be corrected by the decoding process is added.

17. The method according to claim 14, wherein the state information indicates whether or not the $a^{th}$ soft-input value is changed, and the method further comprises determining to execute the calculation of the $a^{th}$ reliability information when the state information indicates that the $a^{th}$ soft-input value is changed.

18. The method according to claim 14, further comprising:
repeatedly executing the decoding process of the $a^{th}$ component code until an end condition is satisfied, and to execute a decoding process selected from among a plurality of types of decoding process for the $a^{th}$ component code, the state information indicates a type of the selected decoding process; and
determining to execute the calculation of the $a^{th}$ correction information when a type of a $k^{th}$ (k being an integer of 1 or more) decoding process indicated by the state information is different from a type of a $(k+1)^{th}$ decoding process.

19. The method according to claim 14, wherein the state information indicates whether or not a remaining storage capacity of the correction information memory is equal to or less than a first threshold value, and
the method further comprises determining to execute the calculation of the $a^{th}$ reliability information when the remaining storage capacity of the correction information memory is equal to or less than the first threshold value.

20. The method according to claim 14, further comprising correcting the read information stored in the read information memory based on the $a^{th}$ correction information and correcting the syndrome value stored in the syndrome value memory according to the correction of the read information when the $a^{th}$ reliability information is larger than a second threshold value.

* * * * *